United States Patent [19]

Yonezawa et al.

[11] 4,191,714
[45] Mar. 4, 1980

[54] CURABLE POLYESTER OLIGOMER AND A PROCESS FOR PRODUCING SAME

[75] Inventors: Kazuya Yonezawa; Yasushi Kato; Hisao Furukawa; Masaaki Azuma, all of Kobe, Japan

[73] Assignee: Kanegafuchi Kagaku Kogyo Kabushiki Kaisha, Osaka, Japan

[21] Appl. No.: 973,889

[22] Filed: Dec. 28, 1978

[30] Foreign Application Priority Data

Dec. 29, 1977 [JP] Japan ............................... 52/159436
May 31, 1978 [JP] Japan ................................. 53/66116

[51] Int. Cl.² ...................... C08L 83/12; C08L 43/04
[52] U.S. Cl. .................................... 525/102; 525/328; 525/329; 525/342; 525/100; 528/38; 528/272; 528/297
[58] Field of Search .......... 260/40 R, 824 R, 824 EP; 526/15, 16, 29; 528/11, 30, 31, 32, 38, 41, 272, 297

[56] References Cited

U.S. PATENT DOCUMENTS

| | | | |
|---|---|---|---|
| 3,655,598 | 4/1972 | Antonen et al. | 260/18 S |
| 3,678,010 | 7/1972 | Brode | 528/38 X |
| 3,701,815 | 10/1972 | Matzner et al. | 260/824 R |
| 3,823,098 | 7/1974 | Joslyn | 528/38 X |
| 3,970,709 | 7/1976 | Owston | 528/38 X |
| 4,033,924 | 7/1977 | Mine et al. | 528/11 X |
| 4,070,343 | 1/1978 | Kishimoto et al. | 528/11 X |
| 4,141,926 | 2/1979 | Ariga et al. | 260/824 EP |

Primary Examiner—Lucille M. Phynes
Attorney, Agent, or Firm—Moonray Kojima

[57] ABSTRACT

A curable polyester oligomer having a molecular weight of between 300 and 10,000 and at least one silyl radical at the side chain or at the end of the molecule, with the silyl radical being represented by the formula:

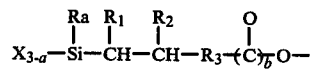

wherein R, $R_1$ and $R_2$ represent hydrogen or any monovalent hydrocarbon radical with 1 to 10 carbon atoms, selected from the group consisting of alkyl radical, aryl radical and aralkyl radical; $R_3$ represents divalent hydrocarbon radical with 0 to 10 carbon atoms, "X" represents any radical selected from the group consisting of halogen, alkoxy, acyloxy, aminoxy, phenoxy, thioalkoxy, and amino radicals; "a" is an integer 0, 1 or 2; and "b" is an integer 0 or 1.

10 Claims, 1 Drawing Figure

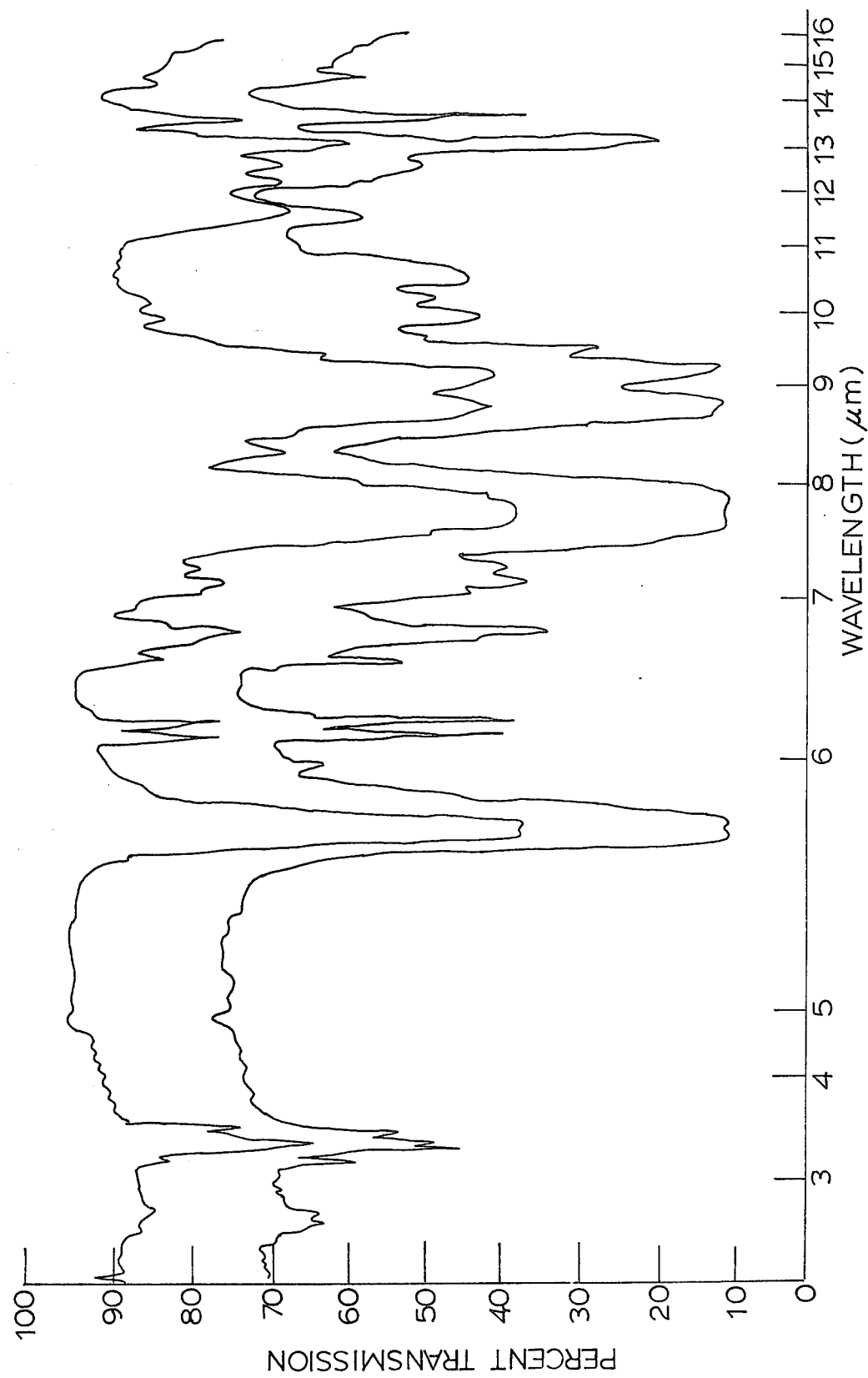

CURABLE POLYESTER OLIGOMER AND A PROCESS FOR PRODUCING SAME

BACKGROUND AND SUMMARY OF THE INVENTION

This invention relates to a novel polyester oligomer curable at ambient temperature and a process for producing same.

There have been attempts to utilize polyester oligomers, as they are, or as an intermediate product, by introducing various functional groups to activate them, such as for example, as surfactants, paints, adhesives, sealants, printing inks and the like. As for polyester oligomers, it has already been known that the properties thereof when used as coated films, such as adhesiveness, strength, oil and solvent resistance, can be improved by introducing silicone radicals capable of being hydrolyzed into Si—O—C bond in alkyd resin to be modified.

However, among these priorly known polyester oligomer, there is none which has silyl radicals in the molecule in the manner as shown below in formula (1).

The object of this invention is to provide an oligomer which is able to be easily liquidized without or with only a very small amount of solvent and cured at an ambient (i.e. room) temperature when exposed to air, and to provide a curable oligomer having excellent adhesiveness to various kinds of plastics and glasses. The air usually contains moisture.

The invention encompasses a polyester oligomer having a molecular weight of between 300 and 10,000 and curable at ambient temperature and having at least one silyl radical in the molecule, with the silyl radical being represented by the formula:

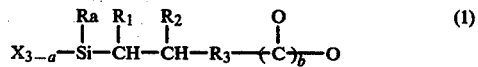

wherein R, $R_1$, and $R_2$ represent hydrogen or any monovalent hydrocarbon radical with 1 to 10 carbon atoms and selected from the group consisting of alkyl radical, aryl radical and aralkyl radical; $R_3$ represents any divalent hydrocarbon radical with 0 to 10 carbon atoms, "X" represents any radical selected from the group consisting of halogen, alkoxy, acyloxy, aminoxy, phenoxy, thioalkoxy, and amino radicals; "a" is an integer 0, 1, or 2; and "b" is an integer 0 or 1.

DETAILED DESCRIPTION OF PREFERRED EMBODIMENTS

The polyester oligomer with silyl radicals of this invention, may be readily obtained by reacting with a polyester oligomer having a molecular weight of between 200 and 8,000 and having C—C double bonds, in the presence of a catalyst comprising one or more transition metals in the VIII group of the Periodic Chart, such as platinum, a hydrosilane compound represented by the formula:

wherein "R" represents any monovalent hydrocarbon radical selected from the group consisting of alkyl radical, aryl radical and aralkyl radical; "X" represents any radical selected from the group consisting of halogen, alkoxy, acyloxy, aminoxy, phenoxy, thioalkyoxy, and amino radicals; and "a" is an integer 0, 1 or 2.

The polyester oligomer having the C—C double bonds which is used in this invention, can be illustratively prepared in one or more of the following manners:

(I) A polyester* containing hydroxy radicals at the molecular ends is made to react on allyl chloride in the presence of a base, for example, sodium hydride.
(*For example, this polyester may be of a type marketed under the trade name "Desmophene" and manufactured by Nihon Polyurethan Co., Ltd).

(II) A polyester having hydroxy radicals at the molecular ends, is made to react on diallyl ester, such as diallyl phthalate, in the presence of a catalyst, such as toluene sulfonic acid, capable of causing ester interchange reaction, such as disclosed in Japanese Patent Application (laid-open No. 51-142027).

(III) Dibasic acid and diol are made to condense in the presence of excess amount of acid. In the course of, or after, the reaction monohydric alcohol with C—C double bond is added so as to esterify the condensate.

(IV) A polyester with acryloyl radicals can be obtained by condensation reaction among diol, dibasic acid and acrylic acid (or methacrylic acid) according to conventional processes.

(V) A condensation reaction is caused between diol and dibasic acid. Prior to the reaction, a small amount of epoxy compound with C—C double bond is added for a part of diol.

(VI) Alcohol, epoxy compound, and acid anydride are made to react in the presence of a tertiary amine to produce a polyester. This process has been proposed in Japanese Patent Application 52-159436. Monohydric alcohol and epoxy compound having a C—C double bond, respectively, are partially or wholly substituted for the alcohol and the epoxy compound. As starting materials to give polyester, dibasic acids, glycols, and polyhydric alcohols have been used in the above processes (I) through (V). The following are typical compounds which may be illustratively used:

Dihydric alcohols (Glycols):
Ethylene glycol, propylene glycol, butane diol, hexamethylene glycol, hydrogenated bispheno A, neopentyl glycol, diethylene glycol, triethylene glycol and dipropylene glycol.

Polyhydric alcohols:
Glycerine, trimethylol methane, trimethylol propane, penta erythritol.

Dicarboxylic acids:
Phthalic acid, isophthalic acid, terephthalic acid, tetrahydrophthalic acid, hexahydrophthalic acid, tetrachlorophthalic acid, polybutadiene dicarboxylic acid, oxalic acid, maronic acid, succinic acid, adipic acid, sebacic acid, malei acid, fumaric acid, cyclopentane dicarboxylic acid.

Polycarboxylic acids:
Trimellitic acid, butane tricarboxylic acid, pyromellitic acid.

Furthermore, carboxylic acid anhydride together with acyl halide can be similarly used as polycarboxylic acid is. Allyl alcohol and methallyl alcohol are examples of monohydric alcohols with the C—C double bonds explained in methods (III) and (VI) above. Allyl glycidyl ether, glycidyl acrylate and glycidyl methacrylate are examples of epoxy compounds with C—C double bonds described in methods (V) and (VI) hereinabove. When considering how to introduce the C—C double bonds into the polyester molecule the above examples may be considered. The synthesis process (VI) is the most preferable among the six processes because with process (VI), the amount of C—C double bond in the molecule and the condensate by-products in the reaction can be readily controlled.

As a result of intensive investigations on the process of introducing allylically unsaturated group upon synthesis of polyester oligomer, the inventors have discovered a process for synthesizing a novel polyester oligomer containing allylically unsaturated group, which process permits optionally controlling the content of the allylically unsaturated group and molecular weight of the oligomer by reacting a system comprising an acid anhydride, epoxy compound and alcohol (as a molecular weight adjusting agent) using a tertiary amine or quanternary ammonium salt as a catalyst. The use of an allyl type alcohol as the alcohol component enables introduction of allylically unsaturated group and adjustmen- of molecular weight at the same time.

That is, the polyester oligomer of the present invention is a novel polyester oligomer having a molecular weight of 200–8,000, main chain of which substantially comprises a polyester formed by the reaction between an acid anhydride, epoxy compound and alcohol, and which has at least one allylically unsaturated group represented by the following formula:

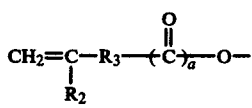

(3)

wherein $R_2$ represents a hydrogen atom or a monovalent hydrocarbyl group selected from the group consisting of alkyl group, aryl group, and aralkyl group having 1 to 10 carbon atoms, $R_3$ represents a divalent hydrocarbyl group having 0 to 10 carbon atoms, and "a" represents an integer 0 or 1 in the side chain or at the terminal end in one molecule.

The term "allylically unsaturated group" as herein used means that group represented by the above formula (3). The term "allyl type alcohol" means the alcohol compound containing

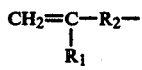

(4)

as this allylically unsaturated group in the molecule.

The polyester oligomer of the present invention is obtained by reacting a system comprising (a) one, or a mixture of two or more, of the compounds having at least one acid anhydride group of

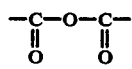

(5)

such as phthalic anhydride, di-, tetra- or hexa-hydrophthalic anhydride, succinic anhydride, maleic anhydride, chloromaleic anhydride, pyromellitic anhydride, polyadipic anhydride, polysebacic anhydride, polyisophthalic anhydride, etc; (b) one, or a mixture of two or more, of compounds having at least one epoxy group of

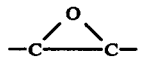

(6)

such as ethylene oxide, propylene oxide, epichlorohydrin, allyl glycidyl ether, styrene oxide, cyclohexene oxide, Epikote 828 (manufactured by Shell International Chemicals Corp), and, as a molecular weight adjusting agent (c) a monohydric or polyhydric alcohol, such as methyl alcohol, ethyl alcohol, propyl alcohol, allyl alcohol, methallyl alcohol, etc.

As a catalyst for the reaction, there may be illustratively used: tertiary amines and quaternary ammonium salts, such as for example, as tertiary amines, p,p'-bis(-dimethylaminophenol)methane, dimethylaniline, N,N-dimethylpropylamine, dibutylpropylamine, tributylamine, N,N-dimethylbenzylamine; and as quaternary ammonium salts, benzyltrimethylammonium chloride, phenyltributylammonium chloride, cyclohexyltributylammonium sulfate, benzyltrimethylammonium borate.

The reaction temperature is preferably between 70° C. and 150° C. The reaction may be carried out in an inert solvent having no active hydrogen atoms. In case the viscosity of the reaction system becomes undesirably high, such as n>20, it is preferable to conduct the reaction in the presence of a solvent. Examples of such solvents are tetrahydrofuran, dioxane, toluene, dimethylformamide, etc.

In this reaction, the charging ratio of acid anhydride (a) to epoxy compound (b) can be changed over a wide range without influencing the reaction rate at an initial stage and the molecular weight of the oligomer. Thus, the reaction can be completed in a shorter time by initially adding (b) in an excess amount by 1 to 3 equivalent weights based on (a) or, in the case of using (a) and (b) in equivalent amounts, by further adding (b) at a stage near completion of the reaction. Excess (b) may be removed under reduced pressure.

The molecular weight of the oligomer can be freely controlled by the amount of alcohol (c). Furthermore, the use of an allyl type alcohol, such as allyl alcohol, enables better control of the molecular weight and introduction of allylically unsaturated group at the same time. That is, as will be shown in Table 1 in the Examples, it is clear that allyl alcohol is introduced into one end of the oligomer.

The content of the allylically unsaturated group in one molecule can be increased by adding as one of component (b), a compound having both allylically unsaturated group and epoxy group, such as allyl glycidyl ether (AGE). As shown in Table 1, the content of the allyl group in synthesized oligomer coincides with the value expected from the amount of added AGE.

For example, the following compound is obtained by reacting an acid anhydride containing one acid anhydride group with an epoxy compound containing one epoxy group in the presence of a monohydric alcohol

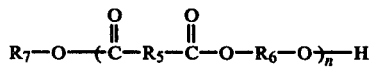

(7)

wherein, $R_5$, $R_6$ and $R_7$ represent residues of acid anhydride, epoxy compound and alcohol, respectively, (usually organic groups having 1 to 30 carbon atoms), and "n" represents an integer 1 to 50.

When allyl type alcohol is used as the alcohol, $R_7$ is a group represented by

When a compound containing allylically unsaturated group is used as part or all of the epoxy compound, $R_4$ will contain the allylically unsaturated group of

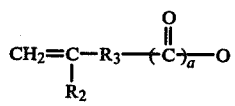

As the compounds containing both allylically unsaturated group and epoxy group, methallyl glycidyl ether, allylglycidyl ester, etc may be used as well as AGE. If allyl alcohol is used in this reaction, $R_7$ can be shown as

If allyl glycidyl ether is partly or wholely employed herein, $R_6$ will be

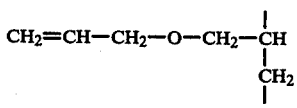

In the case of glycidyl acrylate, $R_6$ becomes

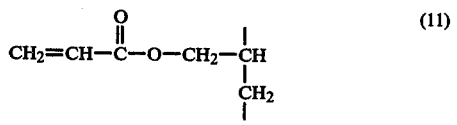

and glycidyl methacrylate makes $R_6$

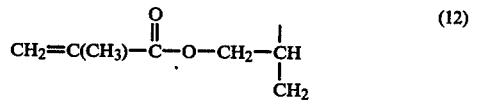

In the above formula, the alcohol residue is located at the terminal end since monohydric alcohol is used. However, existence of the alcohol residue at the terminal end of the molecule is not always necessary, and, when a polyhydric alcohol is used, it is inserted between the polyester bonds. In the present invention, the term "the main chain composed substantially of" means that residues derived from other compounds than acid anhydride or epoxy compound may exist in a slight amount, as above illustrated.

The above example illustrates the case of introducing an alcohol residue, in particular allylically unsaturated group-containing residue, at the one end of the molecule. It is possible to intruduce the residue at both ends. For example, it is possible to once complete the reaction in the system containing excess (a), and then add as component (b) AGE in a necessary amount.

When process (VI) hereinabove, is conducted, the molecular weight of the produced polyester oligomer can be adjusted to be within the range of 200 and 8,000 at will and the number of C—C double bonds to be introduced can be varied by controlling the amount of alcohol and/or epoxy compound in which the same double bonds are contained.

In using as starting material for such curable composition, the number of the allylically unsaturated group in the molecule may be one, although two or more are preferable. The olefin equivalent weight (namely, molecular weight per one allylically unsaturated group) is preferably 200 to 600. In the case of using the composition as a solvent free paint, the polymerization degree (n) is preferably not more than 10, since "n" of more than 10 results in high viscosity.

The thusly synthesized allylically unsaturated group containing polyester oligomer can be used, as such, as a paint composition which can be radically cured. Hydrolyzable silicon functional group can be introduced thereinto according to the process described in Example 8. That is, a silicon group can be introduced into the polyester by reacting the allylically unsaturated group of the allylically unsaturated group-containing polyester oligomer with a hydrosilicon compound in the presence of a group VIII transition metal catalyst.

Among the hydrosilanes represented by formula 3 hereinabove, and which may be used in the invention, there are illustrated the following: Tricholoro silane, methyl dichlorosilane, dimethyl chlorosilane, phenyl dichlorosilane (silanes halide); trimethoxy silane, triethoxy silane, methyl diethoxy silane, methyldimethoxy silane, phenyl dimethoxy silane (alkoxy silanes); triacetoxy silane, methyl diacetoxy silane, phenyl diacetoxy silane (acyloxy silanes); triaminoxy silane, methyl diaminoxy silane, methyl diaminosilane, etc.

The usable amount of hydrosilane can be varied with the number of C—C double bonds, but the most preferable amount of hydrosilane is the equivalent of 0.5 to 2.0 times as much as the equivalent of the polyester oligomer. An amount more than this may be used, but the excess is recoverable in the form of unreacted hydrosilane. To be connected, silane halides can be easily employed in the invention, which is highly reactive and made from inexpensive materials. The polyester oligomer prepared from silane halide rapidly cures at an ambient temperature producing hydrogen chloride gas when allowed to stand in air.

Hydrogen chloride may be esthetically undesirable because of its stinging odor and corrosiveness, which limit the use of silane halide to a narrow list, from that viewpoint. When this is significantly taken into consideration, it is desirable for halogen radicals to be substituted for other radicals to be easily hydrolized. Among those radicals are alkoxy, acyloxy, aminoxy, phenoxy, thioalkoxy, amino radicals and the like. In the process for substituting halogen radicals for these hydrolizable radicals, the following compounds react on halogen radicals:

1. methanol, ethanol, 2-methoxy ethanol, sec-butanol, tert-butanol, phenyl (alcohols, or phenols),
2. alkali metal salt of alcohols, or phenols,
3. orthoformic acid, orthoformic acid ester (orthoformic acid alkylate).

In the process for converting halogen radical into acyloxy radicals, the following compound are used:

1. acetic acid, propionic acid, benzoic acid (carboxylic acids), 2. alkali metal salt of carboxylic cid.

Furthermore, in order for halogen radicals to change for aminoxy ones, the following are favorably used to react on halog radicals:

1. N,N-dimethyl hydroxylamine, N,N-diethyl hydroxylamine, N,N-methylphenyl hydroxylamine, N-hydroxypyrolidine (hydroxylamines)
2. alkali metal salts of primary and secondary amines.

In order to substitute halogen radicals for amino radicals, either primary or secondary amines such as N,N-dimethylamine, N,N-methylphenylamine or pyrolidine, or alkali metal salts thereof are to react on halogen radicals.

In order to substitute for thioalkoxy radicals, thioalcohols, such as ethylmercaptans, or thiophenols, or alkali metal salts thereof are to react on halogen radicals.

According to the invention, a catalyst using one or more transition metals is required to be present in the step where hydrosilane is made to react on the C—C double bond. The catalyst may use a transition metal complex compound selected from platinum, rhodiu, cobalt, paladium and nickel complex compounds. See for reference, Journal of the Organic Synthetic Chemical Society, 28, pp919 (1979).

This hydrosilyl radical introducing reaction can be accomplished at an arbitrary temperature between 50° C. and 150° C. for a period of time from one to four hours. In regard to the silyl radicals, not only halogen, but also hydrolizable radicals, such as alkoxy, acyloxy can be substituted for the other hydrolizable one, for example aminoxy, as desired. The reaction temperature used, is between 20° C. and 120° C. In such case, solvent is not always used for progressing the reaction, but an inert solvent like ethers or hydrocarbons are preferably selected for this purpose, if necessary.

Among the polyester oligomers to be subjected to the hydrosilylation reaction are thos which contain hydroxy radicals in the molecule. If silane halide is applied in the reaction, the above hydroxy radicals react on halogens in the silane halide and a bond between the polyester and silicon atoms is newly formed by virtue of the presence of alkoxy radicals, and this sometimes follows gelatinization in the course of the reaction. So it is advisable to metnion that the hydrosilylation reaction is to be carried out with the polyester free from hydroxy radicals which has been preliminarily treated with acetic acid anhydride or the particular silane halide such as trimethyl chlorosilane in which such bond as

is not contained. Briefly, the reaction should be made after unreacted silane halide, acetic acid anhydride, and produced hydrochloric acid or acetic acid are removed.

To illustrate, when the polyester oligomer with C—C double bonds synthesized according to the process (VI) hereinabove, is subjected to the hydrosilyl radical introducing reaction, the radical represented by the below formula can be introduced:

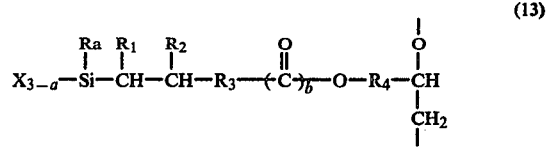

(13)

wherein R, $R_1$, $R_2$, $R_3$, X, "a" and "b" are as defined above. $R_4$ represents alkyl radicals with 1 to 10 carbon atoms.

When allyl glycidyl ether is used as an epoxy component of the polyester, the radical becomes the following structure:

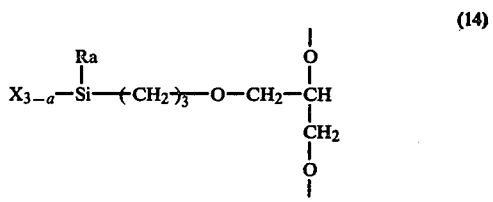

(14)

and when glycidyl acrylate is used, the radical becomes the following structure:

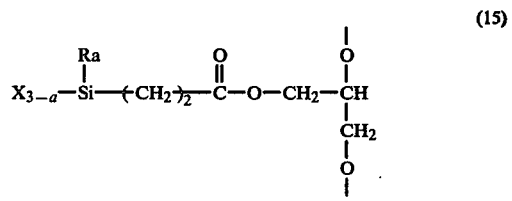

(15)

and when glycidyl methacrylate is used, the structure becomes:

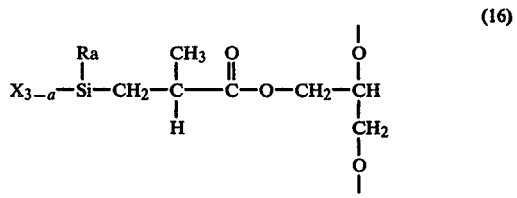

(16)

The polyester oligomer with silyl radicals of the invention can be prepared in a way other than those discussed above. For example, when alcohol, epoxy compound, and acid anhydride react on each other in the presence of tertiary amines, the epoxy compound may be replaced with γ-glyciloxypropyl trimethyoxy silane.

The novel polyester oligomer becomes cured at an ambient temperature by making a network structure in itself when exposed to moisture in the air. The curing rate is affected by ambient temperature, relative humidity, together with the kind of hydrolizable radicals. Accordingly, when preparing the polyester oligomer, it is necessary to take into consideration the kind of hydrolizable radicals to be chosen for the given purpose.

In order to cure the polyester oligomer, some amount of curing accelerating agent may be added. For example, one or more of the following can be used: alkyl titanate, metal carboxylate, such as tin octylate, dibutyl tin laurate, amine, such as dibutylamine-2-hexoate, and acidic catalyst and basic catalysts. The amount of curing accelerating agent to be added may range from 0.001 to 10 weight percent, based on the weight of the polyester oligomer.

This oligomer with silyl radicals is excellent in luster and in producing a film firmly adhering to metal or glass. Thus, this oligomer may be incorporated with coating composites, and used, for example for construction materials, aeroplanes, automobiles, electronic parts, sealants and paint composites, and the like. Moreover, it may be used for wrapping materials, molding materials, framing materials and surfacing materials for various kinds of inorganic substances.

Advantageously, the prior art problems are resolved when the polyester oligomer has one hydrolizable silyl radical in the molecule when the polyester oligomer is used as a curing composite material. However, a polyester oligomer having more than one silyl radical is more preferable for imparting surface hardness, heat resistance, boiling water resistance or solvent resistance, to the cured composite. At the same time, it is desirable that the equivalent of the silyl radical (molecular weight per one silyl radical) be present between 200 and 750. When the equivalent value is more than 750, the cured film tends to have a reduced resistivity to boiled water and solvent. Besides, it is also a characteristic of this oligomer that surface hardness, strength, and solvent resistance of the hardened film can be varied by adding such polycondensable monomers as ethylsilicate and its derivatives and hydrolizable oligomers, such as KR 212, KR 213, and the like. (Produced by Shinetsu Chemicals Co., Ltd). Furthermore, into this oligomer can be mixed various kinds of fillers or pigments, among which are included every kind of silica, calcium carbonate, magnesium carbonate, titane oxide, iron oxide, fiberglass, etc.

The appearance of such polyester oligomer having at least one hydrolizable silyl radical is new and the structure thereof can be readily understood from examination of the processes and examples.

The sole FIGURE depicts the infra-red spectrum of absorption of the oligomer, and will be more fully discussed in the Examples, namely, Example 10. In the FIGURE, the top curve shows the absorption spectrum of the polyester oligomer before the silyl radical is introduced, and the bottom curve shows that after the same reaction.

The following examples illustrate in greater detail the process and products of the invention. It is to be understood that the examples are not to be considered to be limiting in any manner.

EXAMPLE 1

148 parts (1 mole) of phthalic anhydride, 72 parts (1 mole) of butylene oxide (BO), 11.6 parts (0.2 mole) of allyl alcohol and 0.5 parts of dimethylbenzylamine were charged into a 1-liter round bottom flask equipped with a stirrer, thermometer, nitrogen bubbling tube and cooling tube, and heated to 100° C. A reaction ratio of 90% (calculated from acid value) was attained in about 3 hours. 7.2 parts of BO was added at this stage. After further reacting for one hour, the reaction ratio reached 99.5%. Excess BO was removed to obtain colorless and viscous polyester oligomer. The resulting oligomer had a molecular weight of 1150, an olefin equivalent weight of 1148 and a hydroxyl equivalent of 1160. The word part whenever used herein means part by weight, unless otherwise stated.

EXAMPLES 2, 3 and 4

Allyl alcohol, allyl glycidyl ether (AGE) and BO were reacted with the reaction ratios shown in Table 1. Other conditions other than the charging ratio were the same as in Example 1. As the amount of allyl alcohol decreased, the hydroxyl equivalent weight increased, the values of which coincided with the values expected from the structure shown in the formula.

The GPC (gel mermeation chromatography) of the product of Example 3 showed that the molecular weight distribution (Mu/Mn) was as narrow as 1.1. As shown in the FIGURE, infrared spectrum thereof showed absorptions of hydroxyl group at 3550 cm$^{-1}$ and 3450 cm$^{-1}$, ester carbonyl group absorption at 1720 cm$^{-1}$ and carbon to carbon double bond absorption at 1645 cm$^{-1}$.

EXAMPLE 5

When the amount of allyl glycidyl ether was increased as in Table 1, to react in the same manner as in Example 1, there was also obtain polyester oligomers having molecular weights and olefin equivalent weights substantially as theoretically calculated.

EXAMPLE 6

148 parts (1 mole) of phthalic anhydride, 46.4 parts (0.8 mole) of propylene oxide (PO), 22.8 parts (0.2 mole) of allyl glycidyl ether, 11.6 parts (0.2 mole) of allyl alcohol and 0.5 parts of dimethylbenzylamine were charged in a 1-liter metallic autoclave, and reacted at 100° C. After 3 hours, 46 parts of PO was added and the reaction was further conducted for one hour to obtain an acid value of 0.5. Then, excess PO was removed to obtain a colorless and viscous oligomer having a molecular weight of 1120 and olefin equivalent weight of 573.

EXAMPLE 7

9.5 parts (0.093 mole) of acetic anhydride was added to 100 parts of the polyester obtained in Example 5, and after reacting at 120° C. for 2 hours, acetic acid and acetic anhydride were removed under reduced pressure. Absorption of hydroxy group in the resulting oligomer almost completely disappeared.

TABLE 1

| | Phthalic Anhydride (molar ratio) | BO (molar ratio) | AGE (molar ratio) | Allyl alcohol (molar ratio) | Molecular Weight[1] | Olefin Equivalent weight[2] | Hydroxy Equivalent Weight[3] |
| --- | --- | --- | --- | --- | --- | --- | --- |
| Ex. 2 | 1 | 0.6 | 0.4 | 0.4 | 640(650) | 320(325) | 660(650) |
| Ex. 3 | 1 | 0.8 | 0.2 | 0.2 | 1190(1200) | 580(600) | 1185(1200) |
| Ex. 4 | 1 | 0.9 | 0.1 | 0.1 | 2100(2300) | 1130(1150) | 2200(2300) |
| Ex. 1 | 1 | 1.0 | 0 | 0.2 | 1150(1158) | 1148(1158) | 1160(1158) |

TABLE 1-continued

| | Phthalic Anhydride (molar ratio) | BO (molar ratio) | AGE (molar ratio) | Allyl alcohol (molar ratio) | Molecular Weight[1] | Olefin Equivalent weight[2] | Hydroxy Equivalent Weight[3] |
|---|---|---|---|---|---|---|---|
| Ex. 5 | 1 | 0.4 | 0.6 | 0.2 | 1200(1284) | 330(321) | 1210(1284) |

NOTES:
[1]Measured according to vapor pressure method (V.P.O.)
[2]Measured according to iodine value test, JIS K-0070
[3]Measured according to hydroxy value test, JIS K-0070

EXAMPLE 8

22.2 parts of the polyester obtained in Example 7, 0.0035 part of chloroplatinic acid and 8.65 parts of methyldichlorosilane were reacted at 80° C. for 3 hours. After completion of the reaction, unreacted methyldichlorosilane was removed udner reduced pressure. 17.6 parts of methanol was added to the residue, and stirred for one hour at room temperature to remove the generated hydrogen chloride gas, and the excess methanol, under reduced pressure. Further, a slight amount of propylene oxide was added to make the system neutral. 2 parts of dibutyltin laurate was added to this system. When this system was cured in the atmosphere, the system became tack-free after one hour, and the pencil hardness became 5H after 3 days.

EXAMPLE 9

A liquid polyester with molecular weight of 500, the molecular ends of which are attached acryloyl radicals (produced by Toa Synthetic Chemicals Co, Ltd, under the trade name "ARONIX"M6100) was put in a nitrogen replaced flask by 100 parts. After adding 55.2 parts of methyl dichlrosilane and 0.01 part of ethyleneplatinum complex thereto, the mixture was allowed to react on each other at 100° C. for 3 hours with stirring in a stream of nitrogen. When the reaction was over, unreacted methyl dichlorosilane was removed under reduced pressure and 85 parts of methyl orthoformate was added at 60° C. with stirring. The reaction system showed neutrality after 30 minutes continuous removal of forming methyl chloride. Light yellowish liquid was produced after removing volatile components (methyl chloride, methyl formate, methyl orthoformate) under reduced pressure.

The infrared absorption spectrum showe complete disappearance of the 1630 cm$^{-1}$ and the 1615 cm$^{-1}$ bands attributed to acryloyl radical. The liquid with 2 parts of dibutyl tin maleate became free from stickiness after 3 hours from being spread on a tin plate and 7 days later it became as hard as HB pencil lead.

REFERENTIAL EXAMPLE 1

A mixture comprising 148 parts (1 mole) phthalic acid anhydride, 34.8 parts (0.6 mole) propylene oxide, 45.6 parts (0.4 mole) allyl glycidyl ether, 11.6 parts (0.2 mole) allyl alcohol, and 0.5 parts dimethyl benzylamine were put into a 1 liter metal autoclave and subjected to reaction at 100° C. with stirring. Three hours later there was added again 4.6 parts propylene oxide in order to continue the reaction for one hour. After the acid value reached 0.5, colorless viscous olgomer was obtained by removing excess polyprylene oxide. The molecular weight of the oligomer was 1200.

To 100 parts of this polyester oligomer was further added 10.2 parts (0.1 mole) of acetic acid anhydride, and the mixture was made to react at 120° C. for 2 hours. Then, excess acetic acid anhydride was removed under reduced pressure. The oligomer had a molecular weight of 1250, an olefin equivalent of 429, and an acetyl value of 70%.

EXAMPLE 10

A mixture was prepared by adding to 100 parts of the polyester synthesized in Referential Example 1, 0.012 part of chloroplatinic acid (isopropanol:tetrahydrofuran=1:10) and 32.2 parts methyl dichlorosilane, and reacted at 80° C. for 4 hours with stirring. After termination of the reaction, unreacted methyl dichlorosilane was removed under reduced pressure. To this was further added 30 parts of methanol and stirring was continued for 1 hour at room temperature to reove generated hydrogen chloride gas and excess methanol, by evacuating the atmosphere. Then, a small amount of propylene oxide was put therein to make the reaction system neutral. Light yellowish sticky oligomer was found after removal of volatile components. The sole FIGURE shows the infrared absorption spectrum of the oligomer. It was proven that 1645 cm$^{-1}$ absorption band assigned to olefin component completely disappears and the silyl value (determined by iodine titration) is 98%. The oligomeric substance, with 2 parts of dibutyl tin laurate, was spread over a glass plate. The oligomer became free from tack and showed a hardness which was the same as 2H pencil lead.

EXAMPLE 11

A mixture was prepared by adding to 100 parts of the polyester obtained in referential example 1, 0.012 part of chloroplatinic acid and 29.6 parts of methyl dimethoxysilane was made to react at 80° C. for 3 hours with stirring. Unreacted methyl dimethoxysilane was removed under reduced pressure. The resulting polyester oligomer showed a silyl value of 90%. One hour after coating a glass plate with the polyester, including 2 parts dibutyl tin laurate, the polyester lost stickiness and became a solid which was as hard as 2H pencil lead.

REFERENTIAL EXAMPLES 2-5.

A mixture comprising phthalic acid anhydride, butylene oxide, allyl glycidyl ether, and allyl alcohol was subjected to reaction in the same was as mentioned in referential example 1. As a result of this, a polyester oligomer, the ends of which sllyl radicals are combined with, was obtained. The molecular weight and olefin equivalent are show in Table 2.

EXAMPLES 12,13,14,15.

To each of the C—C double bonds contained in the polyester oligomers in referential examples 2 to 5, were added methyl dimethoxysilane of 1.2 times equivalent and chloroplatinic acid of 1×10$^{-4}$ time equivalent, then the mixture was allowed to react at 80° C. for 4 hours. The silyl value and the film properties of the obtained polyester are shown in Table 2.

EXAMPLE 16

A mixture was prepared by adding to 100 parts of a polyester with allyl radicals at the molecular ends, 0.009 part of chloroplatinic acid and 28 parts of trichlorosilane, and reacted at 80° C. for 4 hours with stirring. After completion of the reaction, unreacted trichlorosilane was removed under reduced pressure. 33 parts of methanol was added to this system and stirring was continued at room temperature for 1 hour under reduced pressure in order to remove the formed hydrochloric gas and the excess methanol. A small amount of propylene oxide was mixed thereinto to neutralize the reaction system. After volatile matters were removed, light yellowish sticky oligomer was left behind. The silyl value, together with the film properties of the silyl radical containing polyester, are shown in Table 2. It was roven that the reaction to introduction of silyl radicals into the polyester molecule unexpectedly substantially improves the adhesiveness, impact strength and various conditions of the process.

The foregoing, and Table 2 following this paragraph, are illustrative of the principles of the invention. Numerous modifications and extension thereof would be apparent to the worker skilled in the art. All such modifications and extension are to be considered to be within the spirit and scope of this invention.

TABLE 2

| | Polyester with allyl radicals at the ends | | Polyester with Silyl radicals | Polyester film Properties 4* | | | Boiling water test 6* |
|---|---|---|---|---|---|---|---|
| Ref ex. | Molecular weight 1* | Olefin equivalent 2* | Silyl value(%)3* | Pencil lead hardness | Ericksen value | Impact strength ∤ 500 g × 50 cm 5* | |
| Ex. 12 | 2 | 1280 | 340 | 95 | 4H | >9 (mm) | No crack | ◎ |
| Ex. 13 | 3 | 1240 | 440 | 93 | 3H | >9 | was observed | ◎ |
| Ex. 14 | 4 | 1200 | 580 | 94 | 2H | >9 | on the | ◎ |
| Ex. 15 | 5 | 3150 | 980 | 89 | 4H | >9 | cured film | Δ |
| Ex. 16 | 4 | 1200 | 580 | 94 | 2H | >9 | | ◎ |

NOTES:
1* Determined by the measurement of vapour pressure depression.
2* According to the iodine test in JIS K-0070
3* Estimated from the formula:

$$\frac{\left(\begin{array}{c}\text{Iodine value of the polyester with}\\\text{allyl radicals at the ends}\end{array}\right) - \left(\begin{array}{c}\text{Iodine value of the polyester}\\\text{with silyl radicals}\end{array}\right)}{\left(\begin{array}{c}\text{Iodine value of the polyester with}\\\text{allyl radicals at the end.}\end{array}\right)} \times 100$$

4* The polyester mixed with 2 parts dibutyl tin laurate was estimated after 7 day drying by the use of abrasive mild steel #320
5* Dupont Impact Strength (∤, 500g × 50 cm)
6* Boiling water test for two hours; no change◎slight gloss reduction Δ

What is claimed is:
1. A curable polyester oligomer having a molecular weight of between 300 and 10,000, and at least one silyl radicat at the side chain or at the end of the molecule, the silyl radical being represented by the following formula:

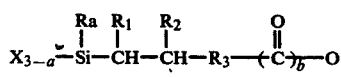

wherein R, $R_1$ and $R_2$ represent hydrogen or any monovalent hydrocarbon radical with 1 to 10 carbon atoms and selected from the group consisting of alkyl radical, aryl radical and aralkyl radical, $R_3$ represents divalent hydrocarbon radical with 0 to 10 carbon atoms, "X" represents any radical selected from the group consisting of halogen, alkoxy, acyloxy, aminoxy, phenoxy, thioalkoxy, and amino radicals, "a" is an integer of 0, 1 or 2 and "b" is an interger of 0 or 1.

2. Polyester oligomer of claim 1, wherein the molecular weight of each of said silyl radical is between 200 and 750.

3. The polyester oligomer of claim 1, or claim 2, wherein said silyl radical is at least at the side chain and at the ends of the molecule.

4. The polyester oligomer of claim 1 wherein said oligomer is admixed with a filler.

5. The polyester oligomer of claim 1, wherein said oligomer is subjected to curing.

6. A process for producing curable polyester oligomer, characterized by making a compound comprised substantially of polyester oligomer having a molecular weight of between 200 and 8,000 and at least one C—C double bond at the side chain or at the end of a molecule, to react with a hydrosilane compound represented by the formula:

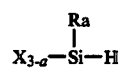

wherein R represents any monovalent hydrocarbon radical having 1 to 10 carbon atoms and selected from the group consisting of alkyl radical, aryl radical and aralkyl radical, "X" represents any radical selected from the group consisting of halogen alkoxy, acyloxy, aminoxy, phenoxy, thioalkoxy and amino radicals, and "a" is an integer of 0, 1, or 2, at a temperature between 50° C. and 150° C.

7. The process of claim 6, wherein the reaction is allowed to progress in the presence of a catalyst comprising a transition metal in Group VIII of the Periodic Chart.

8. The process of claim 6, wherein a compound comprising substantially polyester is the polymerization product of an acid anhydride with epoxy compound in the presence of alcohol.

9. The process of claim 8, wherein said alcohol is an allylic type alcohol represented by the following formula:

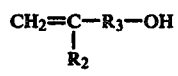
10. The process of claim 7, wherein a part of or all of said epoxy compound contains both epoxy group and allylically unsaturated group of the formula:
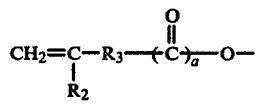
* * * * *